DEFLECTION COIL DRIVING CIRCUIT

Filed March 2, 1966 3 Sheets-Sheet 1

INVENTOR
EDWARD L. WILLIAMS
BY Wood, Herron & Evans
ATTORNEYS

INVENTOR
EDWARD L. WILLIAMS
BY Hood, Gust & Irish
ATTORNEYS

INVENTOR
EDWARD L. WILLIAMS
BY Wood, Gust & Irish
ATTORNEYS

United States Patent Office 3,404,310

Patented Oct. 1, 1968

3,404,310

DEFLECTION COIL DRIVING CIRCUIT

Edward L. Williams, Fort Wayne, Ind., assignor to International Telephone and Telegraph Corporation, Nutley, N.J., a corporation of Maryland Filed Mar. 2, 1966, Ser. No. 531,107
10 Claims. (Cl. 315—27)

This invention relates generally to systems for deflecting an electron beam, and more particularly to a driving circuit for a magnetic deflection coil.

There are instances, particularly in certain image orthicon camera tube systems, where it is desired that full beam deflection be provided with minimum distortion, i.e., maximum linearity, minimum retrace and stabilization time and minimum supply voltage without forced air cooling of the components.

The voltage which appears across a magnetic deflection coil during the retrace time responds to the expression $E=Ldi/dt$. It is thus seen that with fast retrace times, the maximum retrace voltage is correspondingly high. Thus, for a horizontal deflection coil having an inductance of 510 microhenrys with peak sweep current of 1.25 amps and scanning at the rate of 20 frames per second, the maximum retrace voltage is 243 volts. This maximum retrace voltage would appear across the collector-emitter terminals of the transistors of the output stage of a conventional deflection coil driver. However, transistors with the requisite high breakdown $V_{ce}$ ratings and high current capabilities commonly have very poor frequency characteristics and the beta of such power transistors also falls off rapidly above $1/10$ of the maximum collector current. These inherent characteristics of known power transistors thus restrict retrace and stabilization times.

The energy stored in the deflection coil during the scanning time must be dissipated and an equal but opposite amount of energy supplied during the retrace time, the average power which must be dissipated being equal to the average power which must be supplied ignoring losses. This average power is likewise a function of the retrace time and thus, in the case of a horizontal deflection coil operating at 20 frames per second and having an inductance of 510 microhenrys, the average power which must be dissipated during retrace is 48.4 watts. It is thus seen that fast retrace times place heavy requirements upon a conventional transistorized deflection coil driver.

It is therefore desirable where fast retrace times are required to utilize energy recovery to supply the equal and opposite energy to the deflection coil during the retrace time, i.e., to use the energy of the coil's magnetic field as it collapses to establish the new field in the opposite direction thus eliminating the necessity for applying external energy to effect the field reversal, thus in turn reducing the power and voltage requirements for the driver. However, the requirement for maximum linearity during the scanning time dictates the employment of feedback in the driver which is inconsistent with the employment with energy recovery.

It is accordingly an object of the invention to provide an improved driving circuit for a magnetic deflection coil.

Another object of the invention is to provide an improved driving circuit for a magnetic deflection coil wherein maximum linearity is provided with minimum retrace and stabilization time and minimum voltage and power requirements.

This invention in its broader aspects provides a source of periodic sweep voltage signals, such as a sawtooth wave form signal, having alternate scanning and retrace periods. First means is provided coupling the deflection coil to the sweep voltage source for energization thereby during the scanning periods and disconnecting the deflection coil from the sweep voltage source during the retrace periods. A capacitor is provided with second means coupling the capacitor to the deflection coil for charging the capacitor thereby to dissipate the energy stored in the deflection coil and for discharging the capacitor thereby to supply substantially equal and opposite energy to the deflection coil during the retrace periods, the second coupling means disconnecting the capacitor from the deflection coil during the scanning periods.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
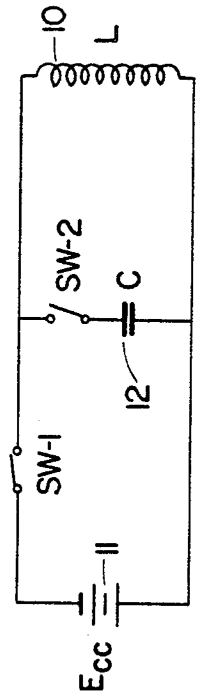
FIG. 1 is a simplified, schematic diagram showing the invention.
Figure 4:
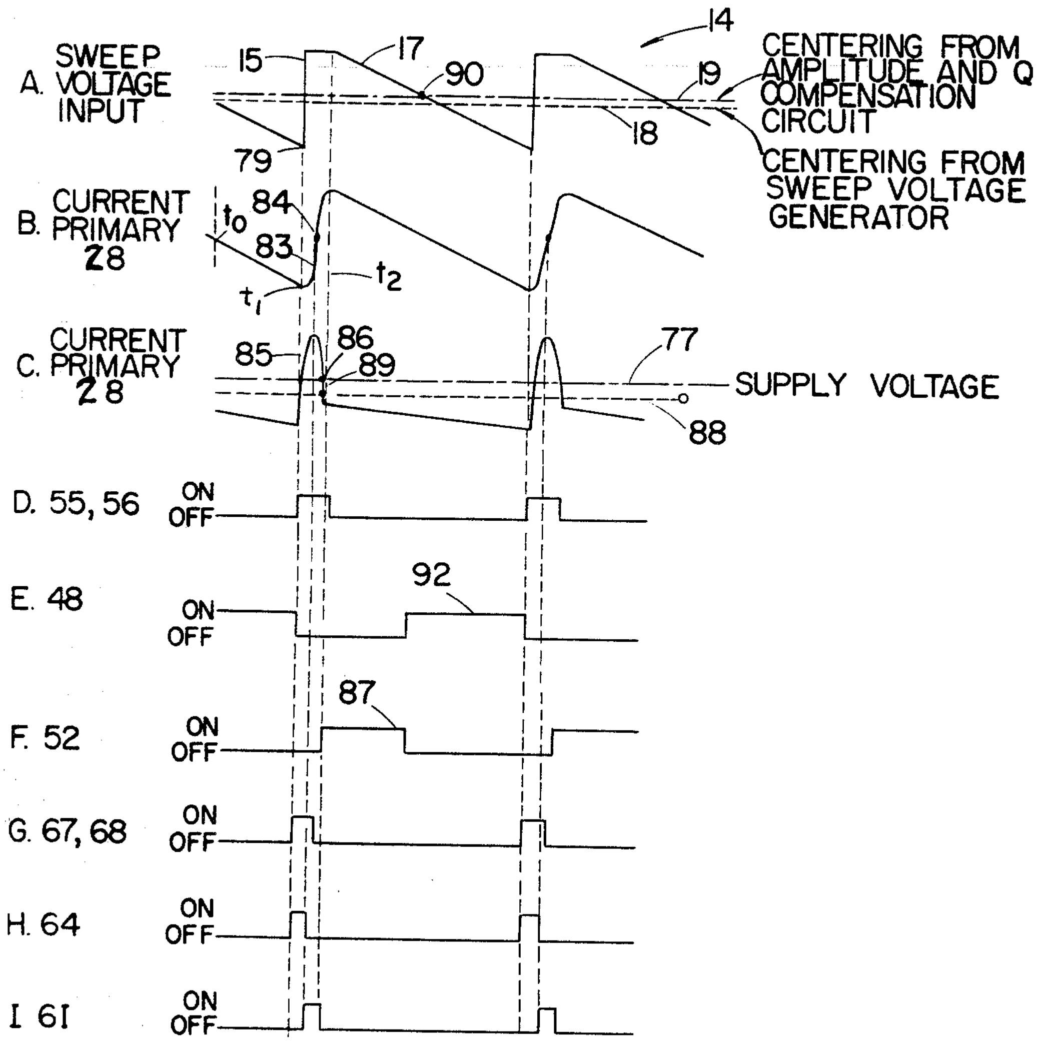
FIG. 4 is a diagram showing wave forms found in the embodiment of FIG. 3.

Referring briefly to FIGS. 1 and 4, a magnetic deflection coil 10 is shown, which typically will be a horizontal deflection coil in a raster scanning system by reason of the much faster retrace times involved in line scanning as opposed to frame scanning. The source of horizontal sweep voltage is shown schematically as battery 11. A switch SW–1 couples the sweep voltage source 11 to the deflection coil 10 during the scanning periods and disconnects the source and deflection coil during the retrace periods. Energy recovery capacitor 12 is provided which is coupled across the deflection coil 10 by the switch SW–2 during the retrace periods, the switch SW–2 disconnecting the capacitor from the deflection coil during the scanning periods. Referring to FIG. 4B, it will be seen that with the switch SW–2 opened, if switch SW–1 is closed at $t_0$, the current through deflection coil 10 will increase from 0 toward minus $I_p$ in a ramp function. At $t_1$ when the current flowing in the deflection coil has increased to minus $I_p$, switch SW–1 is opened causing the source of energy 11 to be disconnected from the coil. The deflection coil 10 at this time has stored energy in the form of a magnetic field. However, with the source of energy 11 disconnected from the coil, this magnetic field will begin to collapse to zero. Thus, at $t_1$ when the switch SW–1 is opened to disconnect the source of energy 11 from the deflection coil 10, the switch SW–2 is closed to couple the energy recovery capacitor 12 across the coil. Thus, as the magnetic field previously established in the deflection coil 10 collapses, current flows through the capacitor 12 charging the capacitor and thus transferring the energy stored in the coil to the capacitor. Ignoring losses, the energy stored in the capacitor at the time the magnetic field in the coil reaches zero has the same value as the stored energy of the magnetic field at $t_1$. When the magnetic field of the coil 10 has collapsed to zero thus transferring its stored energy to the capacitor 12, the direction of current flow in the capacitor reverses and the capacitor discharges through the deflection coil 10 thus transferring the stored energy back to the coil and causing the current in the coil to increase toward plus $I_p$. If the energy recovery capacitor 12 remained connected across the deflection coil 10, this oscillatory transfer of energy between the deflection coil 10 and the capacitor 12 would continue, the amplitude of the current oscillations being damped by losses in the oscillatory or ringing circuit. However, at $t_2$ when the energy stored in the capacitor 12 has been first completely transferred back to the deflection coil 10, i.e., at the end of the first oscillatory reversal of the current through the coil and capacitor from minus $I_p$ to plus $I_p$, switch SW–2 is opened thus disconnecting the energy recovery capacitor 12 from the deflection coil 10 and switch SW–1 is closed thus recoupling the energy source 11 to the deflection coil 10. It will be seen that at $t_2$, the voltage $E_{cc}$ of the source 11 opposes the current flowing in the deflection coil 10 thus causing it to decrease in the linear ramp function to zero where the cycle is repeated.

When the idealized components of the energy recovery system of FIG. 1 are replaced by actual components, it is found that the ramp function of the current flowing in the deflection coil 10 during the scanning periods becomes exponential and thus this system, although providing the retrace time required without imposing high voltage and power requirements upon the sweep voltage source 11, may not provide the requisite linearity. Such increase in linearity may be obtained by feeding back a part of the voltage applied to the deflection coil 10 during the scanning period to the sweep voltage source 11.

Figure 2:
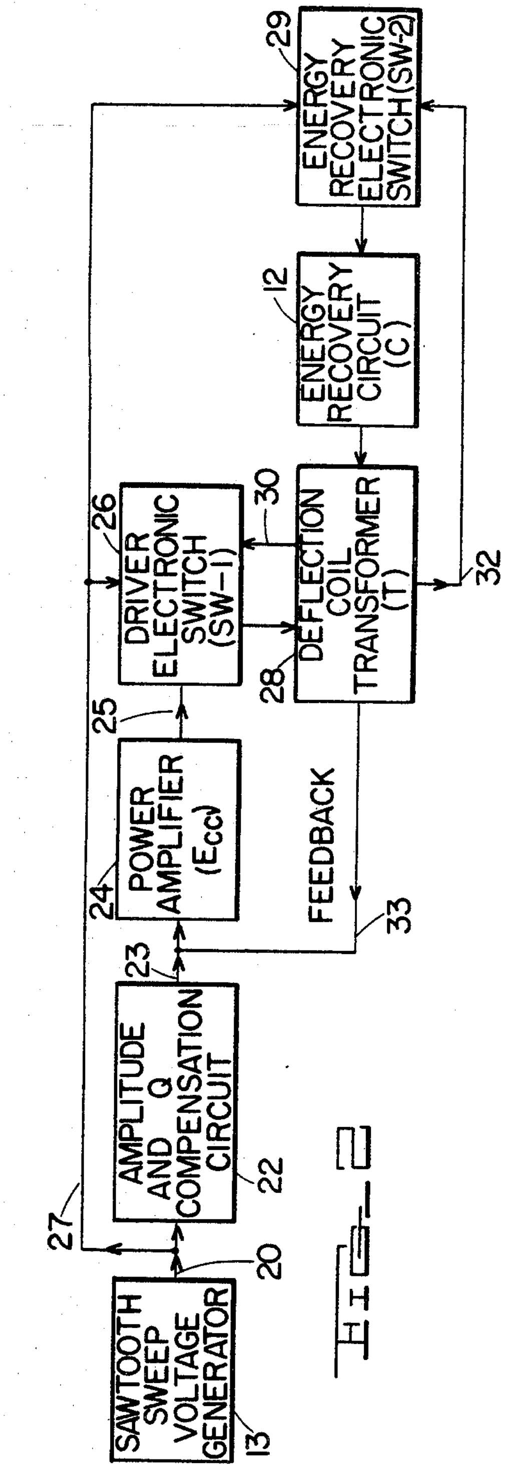
FIG. 2 is a schematic, block diagram showing the complete deflection coil driver circuit of the invention.

Referring now to FIG. 2 in which a complete deflection coil driving circuit incorporating the invention is shown in block diagram form, a sawtooth sweep voltage generator circuit 13 is provided which may be any conventional sawtooth wave form function generator. The sawtooth sweep voltage generator 13 provides a sawtooth wave form voltage 14 as shown in FIG. 4A having a fast rise time 15, a level potential period 16 immediately following the rise time 15, and a ramp function 17, the level potential 16 having a duration substantially equal to the requisite retrace time.

The sawtooth wave form voltage 14 provided by the sweep voltage generator circuit 13 is symmetrical about ground potential 18 as shown in FIG. 4A, whereas it is desirable that the sweep voltage input be off-centered as at 19. The output circuit 20 of the sweep voltage generator 13 is thus coupled to an amplitude and Q compensation circuit 22 to be hereinafter more fully described. Output circuit 23 of the amplitude and Q compensation circuit 22 is coupled to the input circuit of power amplifier 24, which in turn has its output circuit 25 coupled to the driver electronic switch 26 which performs the function of the switch SW–1 of the energy recovery system of FIG. 1. The driver electronic switch is actuated in response to the rise time 15 of the sawtooth wave form sweep voltage and thus the output circuit 20 of the sweep voltage generator 13 is coupled to the driver electronic switch 26 by a connection 27.

In the illustrated embodiment, the deflection coil 10 is coupled to the driver by a deflection coil transformer, the primary winding 28 of which is coupled to the power amplifier by the driver electronic switch 26. The energy recovery capacitor 12 is coupled to the primary winding 28 of the deflection coil transformer by the energy recovery switch 29 which performs the function of the switch SW–2 of the simplified circuit of FIG. 1. Energy recovery electronic switch 29 is likewise actuated by the fast rise time 15 of the sawtooth voltage input and is thus coupled to the output circuit 20 of the sawtooth sweep voltage generator 13 by the connection 27. As will be hereinafter fully described, the driver electronic switch 26 and the energy recovery electronic switch 29 are deactuated thereby again to couple the power amplifier 24 to the primary winding 28 of the deflection coil transformer and to disconnect the energy recovery capacitor 12 therefrom at the conclusion of one oscillatory swing of the current flowing in the capacitor-deflection coil circuit during the retrace period, the primary winding 28 of the deflection coil transformer is thus shown coupled back to the driver and energy recovery switches 26, 29, as at 30, 32. A part of the voltage applied to the primary winding 28 of the deflection coil transformer during the scanning period is fed back to the power amplifier 24 by feedback connection 33.

It will be seen that the sawtooth wave form 14 provided by the sweep voltage generator 13 is distributed to the amplitude and Q compensation circuit 22, driver electronic switch 26, and the energy recovery electronic switch 29. During the scanning time, the sawtooth wave form is transferred through the amplitude and Q compensation circuit 22 to a closed loop comprising the power amplifier 24, the driver electronic switch 26, primary winding 28 of the deflection coil transformer and the feedback connection 33, the energy recovery electronic switch 29 being open during the scanning time. At the start of the retrace period, the fast rise time 15 of the sawtooth wave form actuates the driver electronic switch 26 to its open position and the energy recovery switch 29 to its closed position thereby coupling the energy recovery capacitor 12 across the primary winding 28, the open driver electronic switch 26 protecting the power amplifier 24 from the high voltage which is present across the transformer primary winding 28 during the retrace period.

Figure 3:
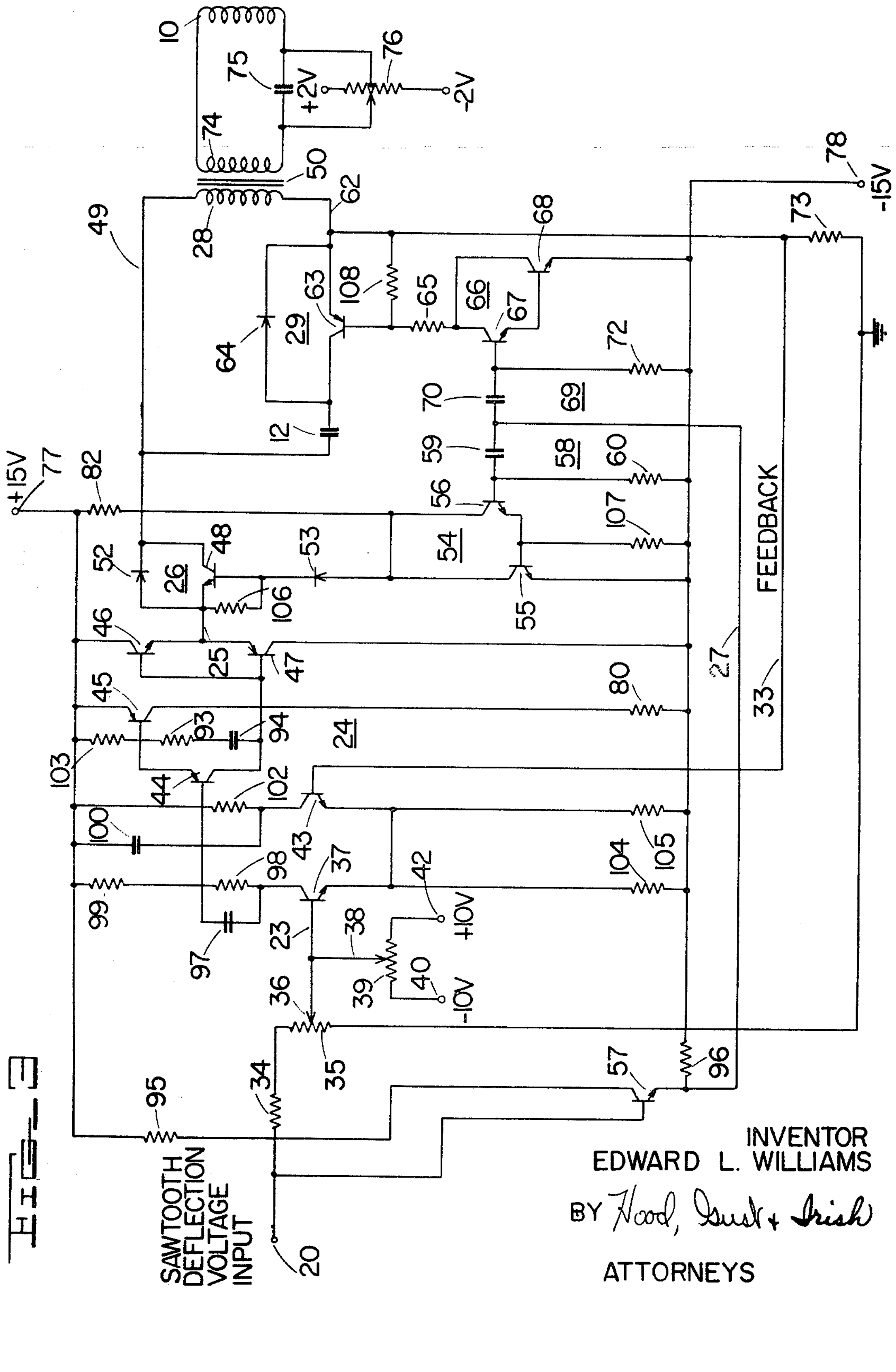
FIG. 3 is a schematic diagram showing one embodiment of the invention.

Referring now to FIG. 3, the output circuit 20 of the sawtooth sweep voltage generator 13 is coupled to ground by resistor 34 and potentiometer 35 which has its adjustable element 36 coupled to the base of transistor 37. The base of transistor 37 is also coupled to the adjustable element 38 of potentiometer 39 which has its opposite ends respectively coupled to equal and opposite sources of potential 40, 42 which are respectively minus 10 volts and plus 10 volts in the illustrated embodiment. Potentiometer 35 forms the amplitude portion and potentiometer 39 forms the Q compensation portion of the amplitude and Q compensation circuit 22.

Power amplifier 24 is an amplifier with complementary class B output and comprises transistors 37, 43, 44, 45, 46 and 47; transistors 37 and 43 being coupled in a differential amplifier configuration with the base of transistor 37 being coupled to the output circuit 23 of the amplitude and Q compensation circuit 22 and the base of transistor 43 being coupled to the feedback circuit 33.

Driver electronic switch 26 comprises transistor 48 having its emitter connected to the output circuit 25 of the power amplifier 24 and its collector connected to one side 49 of primary winding 28 of the deflection coil transformer 50. Diode 52 is coupled across the emitter and collector of transistor 48, as shown. The base of transistor 48 is coupled to driving circuit 54 comprising transistors 55 and 56 by diode 53. Output circuit 20 of the sawtooth sweep voltage generator 13 is coupled to base of emitter follower transistor 57, which has its emitter coupled to the base of transistor 56, by connection 27 and differentiating circuit 58 comprising capacitor 59 and resistor 60.

The energy recovery capacitor 12 is coupled between one end 49 of primary winding 28 and the other end 62 by transistor 63 and diode 64 which is connected across the emitter and collector of transistor 63. Resistor 65 couples the base of transistor 63 to driving circuit 66 comprising transistors 67 and 68. Connection 27 is coupled to the base of transistor 67 by differentiating circuit 69 comprising capacitor 70 and resistor 72.

End 62 of primary winding 28 of the deflection coil transformer 50 is coupled to ground by feedback resistor 73, the feedback connection 33 being coupled to end 62 of primary winding 28 thereby to apply the voltage developed across feedback resistor 73 to the base of transistor 43.

Secondary winding 74 of the deflection coil transformer 50 is coupled to the deflection coil 10 by capacitor 75 and centering control potentiometer 76 having its opposite ends respectively coupled to equal and opposite sources of potential which are respectively plus 2 volts and minus 2 volts in the illustrated embodiment. Sources 77 and 78 of positive and negative potential are provided for the system, shown here as being plus and minus 15 volts respectively.

Referring additionally to FIG. 4, in operation, just before retrace $t_1$ when the input sawtooth wave form 14 is at its most negative point 79, transistors 37, 44 and 45 are close to cutoff, transistor 46 is completely cut off, and transistor 47 is close to saturation with its base current supplied by the minus 15 volts supply 78 through resistor 80. Transistor 48 is saturated and carries all of the current which flows through primary winding 28 of deflection transformer 50, the base current for transistor 48 being supplied from the plus 15 volt source 77 through resistor 82 and diode 53. Transistors 55, 56, 63, 67 and 68 are cut off during scan time.

At the start of retrace $t_1$, the sharp rise 15 of the sawtooth wave form voltage 14 applied to the differentiating circuits 58, 69 causes transistors 55, 56, 67, 68 to conduct. The conduction of transistors 55, 56 places the anode of diode 53 at approximately minus 14 volts thereby cutting off the base current of transistor 48 to cut off the transistor. With diode 52 polarized to conduct in the opposite direction, as will be hereinafter more fully described, cutting off transistor 48 disconnects primary winding 28 of deflection coil transformer 50 from output circuit 25 of power amplifier 24. The time constant of differentiating circuit 58 is chosen so that transistors 55, 56 remain conductive for a period of time at least as long as the retrace interval 16.

The conduction of transistors 67, 68 allows base current to flow through transistor 63 limited only by resistor 65. Transistor 63 remains cut-off at $t_1$ by reason of the polarity of the voltage across winding 28, however diode 69 is rendered conductive directly coupling the energy recovering capacitor 12 across primary winding 28 of deflection coil transformer 50.

Since the power amplifier 24 is disconnected from the primary winding 28 by transistor 48 being cut off and therefore current cannot be supplied to the primary winding by the amplifier, the magnetic field previously established in the deflection coil 10 collapses thereby causing current to flow through capacitor 12 as shown in FIG. 4B at 83. Capacitor 12 is charged by this current flow and thus the energy of the collapsing magnetic field is stored in capacitor 12. When the field strength reaches zero, the direction of current flow reverses, as at 84 in FIG. 4B, and capacitor 12 discharges through primary winding 28 thereby transferring energy back into the primary winding causing the magnetic field to build up in the opposite direction. Because of the losses in the circuit, the energy transferred by the primary winding 28 to the capacitor 12 is always greater than the energy transferred back to the primary winding by the capacitor. For this reason, the Q compensation potentiometer 39 is provided so that the energy gained from the resultant off-centered sweep is equal to the energy lost in the transfer from the primary winding 28 to the capacitor 12 and back to the primary winding.

The oscillatory swing of the current flowing in the capacitor 12 and primary winding 28 during the retrace interval $t_1$–$t_2$ generates a positive going pulse 85 in the primary winding 28 and as shown in FIG. 4C. It will be observed that a portion of the voltage pulse 85 is above the plus 15 volts of the positive supply voltage 77, this portion being applied to diode 52 and back-biasing the same to render it non-conductive. When the voltage pulse 85 passes through the positive supply voltage 77, as at 86 in FIG. 4C, the back-bias on diode 52 is removed. As observed in FIG. 4A, the sweep voltage input, and thus the output of the power amplifier 24, is at that time positive and thus diode 52 will be rendered conductive thereby again coupling output circuit 25 of the power amplifier 24 to primary winding 28, as shown at 87 in FIG. 4F.

Meanwhile, when the current flowing through the capacitor 12 and primary winding 28 reverses, as at 84 in FIG. 4B, diode 64 is cut off, however, transistor 63 is now rendered conductive so the capacitor 12 remains coupled across primary winding 28, as shown in FIGS. 4H and 4I. When the voltage pulse 85 falls below ground potential 88, as shown at 89 in FIG. 4C, which in point of time occurs substantially coincident with the voltage pulse falling below the positive 15 volt supply voltage 77 as shown at 86, transistor 63 is cut off. The time constant of differentiating circuit 66 is set so that transistors 67, 68 are turned off after transistor 63 is turned off, but before the end of the retrace period 16, as shown in FIG. 4G.

It will now be seen that diode 64 conducts from $t_1$ to point 84 while transistor 63 conducts from point 84 until it is cut off at point 89 which is essentially $t_2$. Thus with diode 64 already cut off at the point 84 of the reversal of the current flow through the capacitor 12 and primary winding 28, when transistor 63 is cut off, the energy recovery capacitor 12 is effectively disconnected from primary winding 28 at substantially the same time when the output circuit 25 of the power amplifier 24 is recoupled to the primary winding.

At the start of retrace $t_1$, transistors 37, 44 and 46 in the power amplifier 24 saturate and transistor 47 is cut off, however, transistor 46 cannot go into saturation because of the collector-to-emitter voltage drop across transistor 45 and also transistor 46 has no collector current because the switch 26 is open. At the end of the first oscillatory swing of the current flowing in the capacitor 12-primary winding 28 loop during the retrace period, the power amplifier 24 must again regain control of the magnetic field of the deflection coil transformer 50. Initiation of the retrace level 16 in the voltage input 14 brings transistors 37, 44 and 45 out of saturation, and the collector current of transistor 46 increases from zero to the peak current in the primary winding 28.

As indicated, when the back-bias on the diode 52 provided by the voltage pulse 85 is removed, diode 52 is rendered conductive thereby initiating the scanning period as shown at 87 in FIG. 4F. It will be seen that the sweep section 17 of the sweep voltage input and thus of the output voltage provided by the power amplifier 24 is centered about a reference potential 90 as set by the Q compensation potentiometer 35. Thus, when the output voltage provided by the power amplifier 24 falls to potential 90, diode 52 is rendered non-conductive and transistor 48 is rendered conductive, as at 92 in FIG. 4E so that the output circuit 25 of the power amplifier 24 remains coupled to the primary winding 28 of the deflection coil transformer 50 throughout the scan period.

During the scanning time 17, the power amplifier 24 operates as a conventional feedback amplifier with class B complementary pair output, transistors 37, 43 forming a differential amplifier which compares the sawtooth voltage input with the voltage developed by the current in the primary winding 28 flowing through feedback resistors 73. Transistors 44, 45 form a Darlington amplifier which provides the necessary gain required to drive the complementary pair output 46, 47. Resistor 93 and capacitor 94 in conjunction with transistor 45 form a low pass filter to prevent high frequency oscillation during the scanning coil driver circuit as shown in FIG. 3, the following component values were employed:

| | |
|---|---|
| Resistor **34** ______ohms__ | 470 |
| Potentiometer **35** ______ | 2K |
| Transistor **37** ______ | 2N2270 |
| Potentiometer **39** ______ | 20K |
| Transistor **43** ______ | 2N2270 |
| Transistor **44** ______ | 2N3021 |
| Transistor **45** ______ | 2N1907 |
| Transistor **46** ______ | 2N1490 |
| Transistor **47** ______ | 2N1907 |
| Transistor **48** ______ | 2N3079 |
| Diode **52** ______ | 1N1614 |
| Transistor **55** ______ | 2N1490 |
| Transistor **56** ______ | 2N2270 |
| Capacitor **59** ______mf__ | 5100 |
| Resistor **60** ______ | 1K |
| Transistor **63** ______ | 2N3021 |
| Diode **64** ______ | 1N1614 |
| Resistor **65** ______ohms__ | 82 |
| Transistor **67** ______ | 2N2270 |

| | | |
|---|---|---|
| Transistor **68** | | 2N2270 |
| Capacitor **12** | mmf | .022 |
| Resistor **73** | ohms | ½ |
| Transistor **57** | | 2N2270 |
| Capacitor **75** | mmf | 100 |
| Potentiometer **76** | ohms | 20 |
| Resistor **95** | do | 680 |
| Resistor **96** | do | 330 |
| Capacitor **97** | mmf | 5100 |
| Resistor **98** | ohms | 470 |
| Resistor **99** | do | 100 |
| Capacitor **100** | mf | 22 |
| Resistor **102** | | 1K |
| Resistor **103** | ohms | 1 |
| Resistor **93** | do | 100 |
| Capacitor **94** | mmf | .047 |
| Resistor **104** | | 1.2K |
| Resistor **105** | | 1.2K |
| Resistor **106** | | 10K |
| Resistor **107** | ohms | 47 |
| Capacitor **70** | mmf | 3600 |
| Resistor **72** | | 1K |
| Resistor **108** | ohms | 10 |

While there have been described above the principles of the invention in connection with specific apparatus, it is to be clearly understood that this description is made only by way of example and not as a limitation to the scope of the invention.

What is claimed is:

1. In a deflection system for an electron beam, a driving circuit for magnetic deflection coil means comprising: a source of periodic sweep voltage signals having alternate scanning periods and retrace periods; first means for coupling said coil means to said source for energization thereby during said scanning periods and for disconnecting said coil means from said source during said retrace periods; a capacitor; and second means for coupling said capacitor to said coil means for charging said capacitor thereby dissipating the energy stored in said coil means and for discharging said capacitor thereby supplying substantially equal and opposite energy to said coil means during said retrace periods, said second coupling means disconnecting said capacitor from said coil means during said scanning periods.

2. The circuit of claim 1 wherein said first coupling means includes first switching means, and wherein said second coupling means includes second switching means; and further comprising means for actuating said first and second switching means during said retrace periods thereby respectively to disconnect said source from said coil means and to couple said capacitor thereto.

3. The circuit of claim 2 wherein said retrace periods respectively have a relatively fast rise time, and wherein said actuating means includes means responsive to said fast rise times for actuating said first and second switching means.

4. The circuit of claim 2 further comprising means for deactuating said first and second switching means thereby to recouple said source to said coil means and to disconnect said capacitor therefrom responsive to the first complete discharge of said capacitor to said coil means during each said retrace period.

5. The circuit of claim 2 wherein said scanning periods have a ramp function with first and second portions centered about a reference potential, said first switching means comprising valve means having a control element, said actuating means being coupled to said control element whereby said valve means is rendered non-conductive thereby disconnecting said source from said coil means, the current flow in said coil means in response to said charging and discharging of said capacitor generating a voltage pulse in said coil means, and unidirectional current conducting means coupled across said valve means, said conducting means being polarized to be back-biased by said voltage pulse thereby being rendered non-conductive during said retrace periods, said conducting means being rendered conductive by said first portion of said scanning periods and said valve means being rendered conductive by said second portions of said scanning periods thereby recoupling said source to said coil means during said scanning periods.

6. The circuit of claim 2 wherein said second switching means comprises valve means having a control element, said actuating means being coupled to said control element, the current flow in said coil means and capacitor in response to said charging and discharging of said capacitor reversing and generating a voltage pulse in said coil means, said voltage pulse having first and second portions centered respectively above and below a reference potential, and unidirectional current conducting means coupled across said valve means, said conducting means being conductive and said valve means being non-conductive prior to said current reversal whereby said capacitor is coupled across said coil means, said valve means being rendered conductive and said conducting means being rendered non-conductive responsive to said current reversal, said valve means being rendered non-conductive responsive to said second portion of said voltage pulse thereby disconnecting said capacitor from said coil means.

7. The circuit of claim 1 wherein said first coupling means includes amplifier means having input circuit means coupled to said source and output circuit means for coupling to said coil means; and further comprising means for feeding back a part of the voltage applied to said coil means to said input circuit means during said scanning periods.

8. The circuit of claim 1 wherein said sweep voltage signals have a sawtooth waveform with said retrace periods having a relatively fast rise time, said first coupling means including amplifier means having input circuit means coupled to said source and output circuit means for coupling to said coil means, said output circuit means including first switching means, said second coupling means including second switching means; and further comprising means responsive to said fast rise times for actuating said first and second switching means thereby respectively to disconnect said amplifier means from said coil means and to couple said capacitor thereto, means for deactuating said first and second switching means thereby to recouple said amplifier means to said coil means and to disconnect said capacitor therefrom responsive to the first complete discharge of said capacitor to said coil means during each said retrace period, and means for feeding back a part of the voltage applied to said coil means to said input circuit means during said scanning periods.

9. The circuit of claim 8 further comprising a source of supply voltage having a predetermined level, and wherein said retrace periods comprise said fast rise time and a substantially constant level interval and said scanning periods have a ramp function with first and second portions thereof centered about a reference potential, said first switching means comprising first valve means having a first control element, said actuating means being coupled to said first control element whereby said first valve means is rendered non-conductive thereby disconnecting said output circuit means from said coil means, the current flow in said coil means in response to said charging and discharging of said capacitor reversing and generating a voltage pulse in said coil means, said voltage pulse having a portion above said predetermined level, said predetermined level being above a reference potential level, said first unidirectional current conducting means being coupled across said first valve means, said first conducting means being polarized to be back-biased by said portion of said voltage pulse thereby being rendered non-conductive during said retrace period, said first conductive means being rendered conductive by said first portion of said sweep periods and said first valve means being rendered conductive by said second portion of said sweep periods thereby recoupling said output circuit means to said coil means during said sweep periods, said second switching means comprising second valve means having a second control element, said actuating means being coupled to said second control element, and second unidirectional current conducting means coupled across said second valve means, said second conducting means being conductive and said second valve means being non-conductive prior to said current reversal whereby said capacitor is coupled across said coil means, said second valve means being rendered conductive and said second conducting means being rendered non-conductive responsive to said current reversal, said voltage pulse having a second portion below said last-named reference potential level, said second valve means being rendered non-conductive responsive to said second portion of said voltage pulse thereby disconnecting said capacitor from said coil means.

10. The circuit of claim 9 wherein said actuating means comprises time constant means for respectively actuating said first and second valve means for predetermined times.

References Cited

UNITED STATES PATENTS

| | | | |
|---|---|---|---|
| 2,896,115 | 7/1959 | Guggi | 315—27 |
| 3,185,888 | 5/1965 | Schneider | 315—27 |
| 3,343,061 | 9/1967 | Hetterscheid et al. | 315—27 X |

RODNEY D. BENNETT, *Primary Examiner.*

M. F. HUBLER, *Assistant Examiner.*